United States Patent
Arsovski et al.

(10) Patent No.: US 9,893,765 B1
(45) Date of Patent: Feb. 13, 2018

(54) TRANSMISSION SYSTEM HAVING DUPLICATE TRANSMISSION SYSTEMS FOR INDIVIDUALIZED PRECHARGE AND OUTPUT TIMING

(71) Applicant: GLOBALFOUNDRIES INC., Grand Cayman (KY)

(72) Inventors: Igor Arsovski, Williston, VT (US); Xiaoli Hu, Shanghai (CN); Wei Zhao, Shanghai (CN); Chao Meng, Shanghai (CN); Xiaoxiao Li, Shanghai (CN)

(73) Assignee: GLOBALFOUNDRIES INC., Grand Cayman (KY)

( * ) Notice: Subject to any disclaimer, the term of this patent is extended or adjusted under 35 U.S.C. 154(b) by 0 days.

(21) Appl. No.: 15/464,397

(22) Filed: Mar. 21, 2017

(51) Int. Cl.
*H04B 3/54* (2006.01)
*H04B 1/52* (2015.01)
*H04B 1/04* (2006.01)

(52) U.S. Cl.
CPC .............. *H04B 3/54* (2013.01); *H04B 1/04* (2013.01); *H04B 1/52* (2013.01)

(58) Field of Classification Search
CPC . H04B 3/54; H04B 3/544; H04B 3/60; H04B 1/04; H04B 1/52; H04B 1/02; H04B 1/0483; H04B 1/06
See application file for complete search history.

(56) References Cited

U.S. PATENT DOCUMENTS

| | | | |
|---|---|---|---|
| 5,469,081 A | 11/1995 | Horita et al. | |
| 5,760,621 A | 6/1998 | Keeth | |
| 5,894,238 A | 4/1999 | Chien | |
| 5,907,251 A | 5/1999 | Houghton | |
| 6,326,822 B1 | 12/2001 | Yoon | |
| 6,593,769 B1* | 7/2003 | Rai | H04L 25/0272 326/30 |
| 6,816,554 B1 | 11/2004 | Zhang | |
| 9,484,973 B1 | 11/2016 | Carroll et al. | |
| 2005/0148102 A1 | 7/2005 | Anders et al. | |
| 2006/0220674 A1* | 10/2006 | Yeung | H03K 19/00323 326/29 |
| 2007/0132483 A1* | 6/2007 | Huang | H03K 19/01859 326/86 |

* cited by examiner

*Primary Examiner* — Siu Lee
(74) *Attorney, Agent, or Firm* — Gibb & Riley, LLC; Anthony J. Canale

(57) ABSTRACT

Devices include a primary transmission system, and first and second duplicate (dummy or non-transmitting) transmission systems. The primary transmission system includes a primary transmitter circuit receiving a data signal, a primary transmission line connected to the primary transmitter circuit, and a primary receiver circuit connected to the primary transmission line. The first duplicate transmission system is connected to the primary transmitter circuit, and supplies a transmission timing control signal to the primary transmitter circuit. The primary transmitter circuit stops transmitting (e.g., stops reducing the voltage of the primary transmission line) when the transmission timing control signal is received. The second duplicate transmission system is connected to the primary receiver circuit, and supplies an output timing control signal to the primary receiver circuit, and the primary receiver circuit outputs the data signal when the output timing control signal is received.

20 Claims, 6 Drawing Sheets

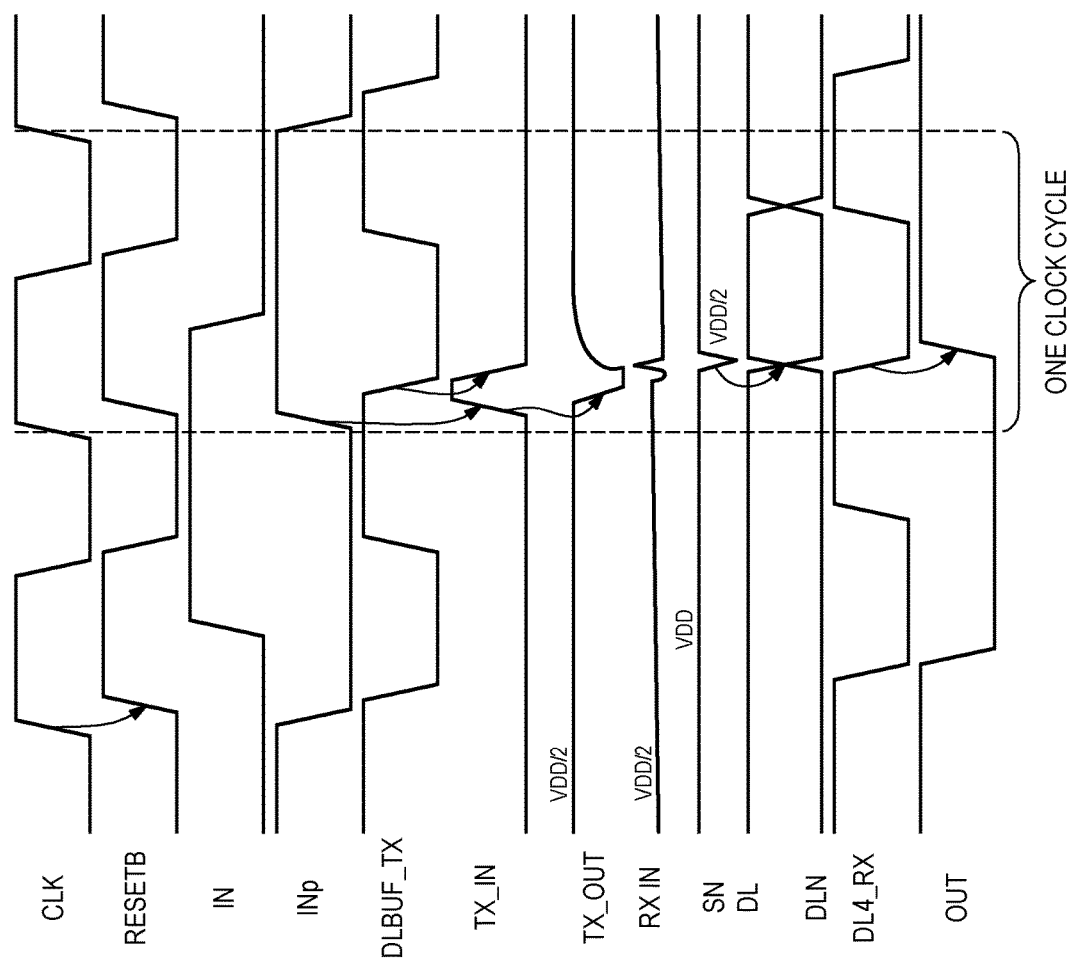

TRANSMISSION SYSTEM HAVING DUPLICATE TRANSMISSION SYSTEMS FOR INDIVIDUALIZED PRECHARGE AND OUTPUT TIMING

BACKGROUND

The present disclosure relates to transmission systems, and more specifically to transmission systems that precharge transmission lines with precharge voltage.

Transmission systems are commonly used within integrated circuit devices to transmit data over electrical conductors (such as wires, buses, transmission lines, etc.). Such transmission systems generally include a transmitter circuit (that receives data input and that controls the voltage level on the transmission line) and a receiver circuit that senses the voltage level of the transmission line, and outputs a transmitted data signal representing the sensed voltage. In many transmission systems, precharge circuitry charges the transmission line, and the transmitter circuit allows such precharge voltage to stay on the transmission line, or changes the precharge voltage to a different voltage to actually transmit the data to the receiver circuit.

All the circuits within transmission systems are controlled by global timing signals, such as global clock signals, global reset signals, global precharge signals, etc. For example, all the precharge circuits within a transmission system simultaneously begin precharging the various transmission lines when they receive a global timing signal. Similarly, all the transmitter circuits within a transmission system simultaneously begin transmission of the data (e.g., begin changing the voltage on the transmission line) upon receipt of a global clock signal. Consistent with the foregoing, all receiver circuits within a transmission system wait until the previous clock cycle has completed before completing the sensing operation of the transmission line voltage. Therefore, such receiver circuits wait until the beginning of the next clock cycle to output the data signal relating to the transmission line voltage sensed during the previous clock cycle.

Precharging the transmission lines requires a certain amount of voltage and, therefore, many efforts have been made to reduce the power consumed during such precharging operations. Similarly, in order to increase the speed of such transmission systems, efforts have been made to shorten the clock cycle.

SUMMARY

Devices disclosed herein generally include (among other components) a primary transmission system, and first and second duplicate (dummy or non-transmitting) transmission systems. The primary transmission system includes (among other components) a primary transmitter circuit receiving a data signal, a primary transmission line connected to the primary transmitter circuit, and a primary receiver circuit connected to the primary transmission line.

The first duplicate transmission system is connected to the primary transmitter circuit, and supplies a transmission timing control signal to the primary transmitter circuit. The primary transmitter circuit stops transmitting (e.g., stops changing the voltage of the primary transmission line) when the transmission timing control signal is received. The second duplicate transmission system is connected to the primary receiver circuit, and supplies an output timing control signal to the primary receiver circuit, and the primary receiver circuit outputs the data signal when the output timing control signal is received.

More specific devices disclosed herein similarly include (among other components) a primary transmission system, and first and second duplicate (dummy or non-transmitting) transmission systems that are used only to produce transmission line length-specific precharge and output timing signals for the primary transmission system. The primary transmission system includes (among other components) a primary transmitter circuit receiving a data signal, a primary transmission line connected to the primary transmitter circuit, and a primary receiver circuit connected to the primary transmission line. The primary transmission system, the first duplicate transmission system, and the second duplicate transmission system are all started using the same global clock signal.

The primary transmitter circuit includes a pull-down transistor controlling voltage pull-down of the primary transmission line. The first duplicate transmission system is connected to the primary transmitter circuit, and supplies a transmission timing control signal to the pull-down transistor. The pull-down transistor stops reducing the voltage of the primary transmission line when the transmission timing control signal is received to decrease the amount of voltage used by the precharging circuit when precharging the length of the primary transmission line (in subsequent data transmissions). The transmission timing control signal is specific to the primary transmission line to which the primary transmitter circuit is connected, and is output independently of all other global timing signals.

The primary receiver circuit includes a precharging circuit that precharges the primary transmission line before each data transmission, a sense latch that outputs a sense output signal, and an output latch. The precharging circuit performs a precharge operation to charge the primary transmission line to a relatively higher voltage state, and the precharge operation is based on the primary transmission line and the sense output signal being at a relatively lower voltage state (e.g., that is lower than a relatively higher voltage state).

The second duplicate transmission system is connected to the primary receiver circuit, and supplies an output timing control signal to the output latch to control the timing of the output latch outputting the data signal. The primary receiver circuit outputs the data signal when the output timing control signal is received by the output latch, and the output timing control signal is specific to the primary transmission line length to which the primary receiver circuit is connected, and is output independently of all other global timing signals.

The first duplicate transmission system has a first delay chain not included in the primary transmission system that produces the transmission timing control signal, and the second duplicate transmission system has a second delay chain not included in the primary transmission system that produces the transmission timing control signal. The first duplicate transmission system and the second duplicate transmission each include a duplicate transmission line that has the same length as the primary transmission line.

BRIEF DESCRIPTION OF THE DRAWINGS

The embodiments herein will be better understood from the following detailed description with reference to the drawings, which are not necessarily drawn to scale and in which:

FIG. 2 is a signal timing diagram illustrating the relative timing of various signals shown in FIG. 1;

DETAILED DESCRIPTION

As mentioned above, within transmission systems the process of precharging the transmission lines requires a certain amount of voltage, which designers desire to reduce in order to save power; and efforts have been made to shorten the clock cycle to make such transmission systems operate faster. Furthermore, as chips become larger, more complex chip level signaling is becoming a larger component of the overall power.

The systems disclosed herein address these issues by using a first duplicate transmission system to supply a transmission timing control signal to the primary transmitter circuit (which causes the primary transmitter circuit to stop transmitting (e.g., stops reducing the voltage of the primary transmission line)), and by using a second duplicate transmission system to supply an output timing control signal that controls when the primary receiver circuit outputs the data signal. The transmission timing control signal and the output timing control signal are specific to the primary transmission line length to which the primary and secondary transmitter circuits are connected, and are output independently of all other global timing signals. Therefore, the structures herein use low-swing signaling to improve both performance and power. Further, these devices detect signal development on each individual bus wire and, when a sensing operation is completed, the devices use reduced voltage to precharge the bus wire to get it ready for the next sensing operation.

Figure 1:
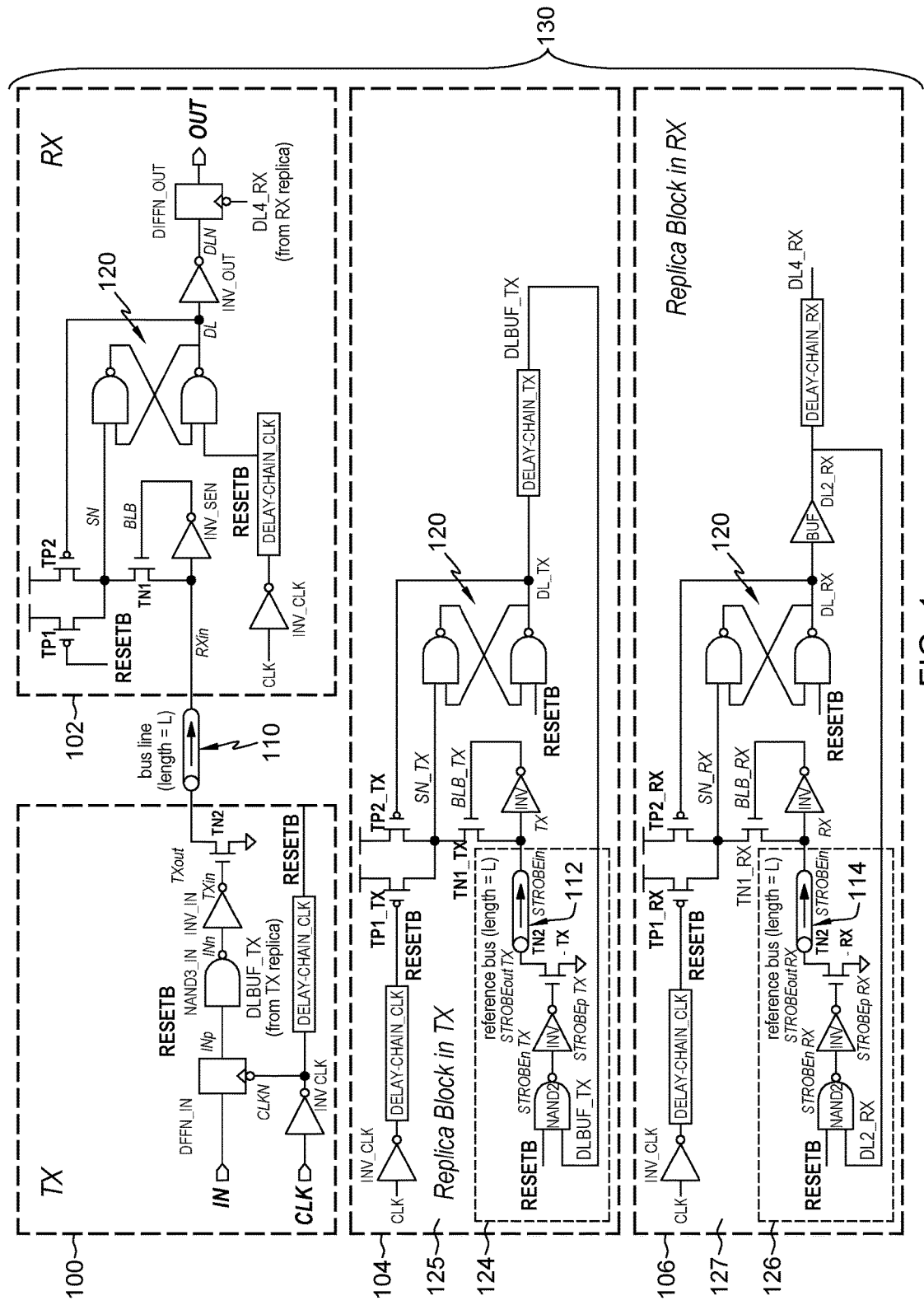
FIG. 1 is a schematic diagram illustrating a transmission system herein.

FIG. 1 illustrates a low-power parallel bus transmission structure 130 that includes a TX (transmit circuit 100), bus line 110, RX (receive circuit 102) transmission system, a replica TX circuit 104, and a replica RX circuit 106. The TX to RX transmission system contains 3 parts: TX 100, bus line (transmission line) 110, and RX 102. As shown in FIG. 1, transmission line 110 transmits signal TXout from TX 100 as signal RXin to RX 102.

FIG. 1 shows that TX 100 has a DFFN_IN (D flip-flop circuit) that latches up and transmits input data IN as controlled by inverted clock signal CLKN. As shown in FIG. 1, the input pin of DFFN_IN is the data to be transmitted IN, and the DFFN_IN includes a clock pin connected to CLKN (inverted clock signal), which is a CLK signal inverted by inverter circuit INV_CLK. The output (INp) of DFFN_IN triggers each time the inverted CLKN goes low (e.g., when CLK goes high). A NAND3_IN (logical NAND circuit) plus INV_IN (inverter circuit) are used to pass the INp to TXin (TXin connects to the gate of a pull down N-type metal oxide semiconductor (NMOS) transistor TN2). The RESETB signal again is a delayed version of CLK signal, which is delayed by the delay circuit DELAY_CHAIN_CLK.

In operation in TX 100, DFFN_IN outputs the INp signal as controlled by the low CLKN signal. The INp signal, and the timing signals RESETB (which is a delayed CLK signal) and DLBUF_TX signals are supplied to NAND3_IN, which outputs INp if either the RESETB and DLBUF_TX signal are absent (e.g., are low) and INp is inverted by inverter INV_IN to INn. The INn controls (gates) transistor TN2, which pulls down the bus line 110 when INn is high. A circuit element is "pulled down" by such a pull-down circuit from a relatively higher voltage (e.g., VDD or VSS) to a relatively lower voltage (e.g., VSS or GND). As described below, in one implementation, the DL signal is discharged from a middle voltage (near VDD/2), and stops discharging before reaching ground, which provides a non rail-to-rail operation, and which minimizes both transmitting latency and power.

When either the RESETB and DLBUF_TX signals are low, transistor TN2 connects the bus line 110 to ground to pull-down TXout and discharge the bus line 110. In this way, transistor TN2 controls the timing of when the TXout pulls-down the bus line 110, and this occurs only when the RESETB signal and the DLBUF_TX are simultaneously supplied to NAND3_IN.

One output of replica TX circuit 104 is DLBUF_TX, which, as noted above, is used to gate (cut off) the INp pulse of NAND3_IN, effectively preventing discharging of the bus line 110. In other words, the other two input signals of NAND3_IN are reset signal RESETB and delay buffer signal DLBUF_TX. The input of such signals to NAND3_IN controls the output (gate) signal INp, and thereby determines the start and stop time of passing signal INp to signal TXin, which controls the pull-down of the bus line 110 through transistor TN2.

The replica TX circuit 104 has a similar structure as the TX to RX transmission system (100-110-102), but includes the delay chain DELAY-CHAIN_TX that outputs DLBUF_TX (and supplies DLBUF_TX to NAND3_IN and the NAND2 within replica TX circuit 104). As can be seen in FIG. 1, replica TX circuit 104 lacks the input structures DFFN_IN, because replica TX circuit 104 does not actually process any input data IN, but merely serves as a timing/control structure. Note that in FIG. 1, the TX side 124 of replica TX circuit 104 is within dashed box 124, while the RX side of replica TX circuit 104 is the area 125 outside dashed box 124 (but within box 104).

In replica TX circuit 104, the RESETB and DLBUF_TX signals are supplied to NAND2, which outputs STROBEn_TX if either the RESETB or DLBUF_TX signals are absent (and this is inverted by inverter INV to STROBEp_TX). The STROBEp_TX controls (gates) transistor TN2-TX, which pulls down the voltage of the reference bus 112 (represented by the STROBEout_TX signal) when STROBEp_TX is high. Thus, when either the RESETB and DLBUF_TX signals are low, transistor TN2-TX is non-conductive; but when the RESETB and DLBUF_TX signals are both simultaneously present (active or high) transistor TN2-TX connects reference bus 112 to ground (STROBEout_TX) to pull-down the reference bus 112.

In this way, transistor TN2-TX controls the timing of when the pull-down voltage STROBEout_TX is supplied to reference bus 112 based on when the RESETB signal and the DLBUF_TX (delayed by DELAY-CHAIN_TX) are supplied to NAND2 in the TX side 124 of replica TX circuit 104.

In replica TX circuit 104, the TX reference bus 112 has the same length as actual bus line 110 (the actual bus line 110 actually transmits/senses data, while the TX reference bus 112 is only used as a timing mechanism). Specifically, the wire of the TX reference bus 112 can travel ½ of the bus length L and back, so the TX reference bus 112 can be positioned on the TX side 124 of replica TX circuit 104. Because the TX reference bus 112 has the same length as actual bus line 110 in replica TX circuit 104, the time to actually resolve DL at the RX side 102 of the data transmission system (100-110-102) can be accurately replicated by replica TX circuit 104. Therefore, such a structure controls when DLBUF-TX is supplied to NAND3_IN in TX 100, which causes NAND3_IN to stop transmitting INp to TXin in TX 100.

Now turning to the RX circuit 102, as shown in FIG. 1, such a circuit includes fast sensing and latching circuitry. The fast sensing circuit includes inverter circuit INV_SEN having its input connected to RXin from the transmission line 110, and to output of transistor TN1. The inverter circuit INV_SEN provides output (bus line bias (BLB)) back to the gate of a NMOS transistor (TN1) in a feedback loop.

In the RX circuit 120, transistor TN1 couples the transmission line 110 to the sensing node signal (SN), which is output of P-type metal oxide semiconductor (PMOS) precharge transistor TP1 (that is connected to a relatively higher voltage source). Therefore, when the delayed clock signal RESETB goes low, the precharge transistor TP1 becomes conductive, which provides the relatively higher voltage to the input of TN1 and to the sensing node SN. When the bus line 110 has a low voltage, inverter INV_SEN provides a high signal to turn on TP1, allowing the relatively higher voltage passing through precharge transistor TP1 to precharge the bus line 110.

As also shown in FIG. 1, a second precharge PMOS transistor TP2, is coupled to signal SN. Here transistor TP1 is a relatively "weak" transistor, meaning that it is more easily turned on relative to transistor TP2. The gate of transistor TP2 is connected to the sense output signal (DL) provided by a SR-latch structure 120 (cross-coupled NAND devices). Thus, the weak precharge PMOS transistor TP1 is connected in parallel with transistor TP2, and the TP2 transistor (when on as a result of a low DL signal) connects the bus line 110 through the conductive TN1 transistor to the relatively high voltage, to precharge the bus line 110 for a sensing operation.

As shown in FIG. 1, the SR-latch 120 couples the sensing node signal (SN) to the sense output (DL). With the structure shown in FIG. 1, the beginning phase of a long data bus precharge operation is triggered by the output DL from the SR-latch 120 in RX 102. Once the evaluation phase is completed by the SR-latch 120 in RX 102, the precharge phase begins immediately, and this structure does not wait for any global precharge signal. Further, with this structure, the precharge timing is dependent on each data bus length. Therefore, this structure improves performance and saves power.

Additionally, the latching circuitry of RX 102 includes an inverter circuit INV_OUT, and a D flip-flop circuit DFFN_OUT. The input of DFFN_OUT is DLN, which is the DL signal inverted by INV_OUT. The clock pin of DFFN_OUT receives the DL4_RX signal, which is generated by replica RX circuit 106, and allows DFFN_OUT to capture the DLN signal once it is resolved by the SR-latch 120. As shown in FIG. 1, the output of DFF_OUT is the OUT signal, which is the data output by the transmission system (100-110-102) shown in FIG. 1.

Replica RX circuit 106 has similar structure with replica TX circuit 104 (and to TX to RX transmission system 100-110-102). However, in replica block 106, the second input to NAND2 is DL2_RX, output from buffer BUF connected to the latch 120. As with the replica TX circuit 104, the TX side 126 of replica TX circuit 104 is within dashed box 126, while the RX side of replica TX circuit 104 is the area 127 outside dashed box 126 (but within box 104). As noted with replica TX circuit 104, the RX reference bus 114 has the same length as the normal bus line 110, as the wire can only travel ½ of the bus length and back, so the RX reference bus is again on the RX side 126.

As shown in FIG. 1, buffered DL2_RX signal is output from the DELAY-CHAIN_RX as signal DL4_RX and supplied to DFFN_OUT in RX 102. In RX 102, the output DL4_RX is used to capture DLN, so the transmitted data can be latched and transmitted to OUT in the same cycle IN toggles. Therefore, such a circuit no longer needs to wait for next clock cycle to capture DLN, so the user at RX can get the data earlier. In replica RX circuit 106, the BUF between DL_RX and DL2_RX is used to improve the loading of DL_RX and make the fast sensing block in replica at RX 106 behave similarly to that in TX to RX transmission system (100-110-102). Therefore, the clock control block which includes INV_CK and DELAY_CHAIN_CLK, and the replica in TX/RX replica circuits 104, 106 can be shared by all similar length bus lines, this greatly simplified the system and saves power.

At the beginning of the reset or precharge phase, RESETB goes from high to low, which turns transistor TP1 on (makes TP1 conductive), which in turn precharges node SN to high by connecting the voltage source to SN through now-conductive TP1. The output of the latch 120 (DL) corresponds to be high, which turns off transistor TP2, however precharge voltage is still supplied to SN through TP1. Signal DL4_RX is delayed by DELAY-CHAIN_RX, and is therefore still low at this point, which prevents the change on DL from being captured by DFFN_OUT.

When the bus line 110 voltage level is lower than the threshold voltage of INV_SEN, the feedback signal (BLB) goes high and turns on TN1, which causes the bus line 110 to be pulled up to the relatively higher voltage of SN (e.g., the bus line 110 is connected to output of the higher voltage of transistor TP1). As soon as the bus line 110 voltage exceeds the threshold voltage of INV_SEN, the BLB goes low and turns off TN1. Therefore, bus line will be precharged at a level a bit higher than the threshold of INV_SEN. At the TX side 100, RESETB is still low, which sets TXin low also, turning TN2 is off and preventing TN2 from pulling the bus line 110 to the relatively lower (e.g., ground) voltage (allowing the relatively higher precharge voltage to stay on the bus line 110).

With conventional transmission circuits, a master signal (master clock, master reset, etc.) controls when precharge operations occur, when sensing occurs, when signal output occurs, etc., for all transmission circuits that receive the master signal. Therefore, conventional transmission devices time all individual transmission circuits using a single master timing signal. However, the transmission system (102-110-104) disclosed herein allows each individual transmission bus length to provide its own timing of when to precharge, when to stop pulling-down a transmission line, and when to output a data signal, as explained in the example below.

During transmission phase, RESETB goes from low to high, turning off TP1. If a is being transmitted, TXin is high and TN2 turns on, and the bus line 110 starts to discharge to the relatively lower voltage through the conductive TN2. The discharging bus line 110 will quickly turn over the inverter INV_SEN and cause the BLB signal to become high. In turn, TN1 then turns on (becomes conductive) because of the high BLB signal, and the conductive TN1 pulls SN down to the voltage level of the discharging bus line 110.

Once the SN signal level is below the trigger point of the SR-latch 120 in RX 102, the sense output (DL) corresponds to be low, turning on TP2. The conductive TP2 starts to precharge the SN node as well as the bus line 110, while DL remains uncharged (at the relatively lower voltage) due to the operation of the SR latch 120.

Also, the DL turning to the relative lower voltage means the data transmission (of data value 1) is completed. Rather than waiting for a global precharge signal to trigger the circuit to stop transmission, the DLBUF_TX signal from the replica TX circuit 104 stops transmission. Specifically, the structurally similar replica TX circuit 104 tracks the latency and generates the DLBUF_TX signal to stop the NAND3_IN from allowing the IN signal to pass the transistor TN2 in the TX circuit 104, which turns TN2 off (non-conductive) to prevent any additional discharge of the transmission line 110. This leaves some voltage in the transmission line 110, requiring less voltage to precharge the transmission line in the next clock cycle. In other words, this structure uses the DLBUF_TX from the replica TX circuit 104 to turn off the transistor TN2 that is discharging the transmission line 110 before an upcoming global timing signal would do so, which save voltage (power) on the next precharge cycle by requiring less power to precharge.

At the same time, the replica RX circuit 106 generates the DL4_RX signal as a clock to capture the DL signal, and passes the DL4_RX to OUT in RX 102. This allows the OUT signal to be output from RX circuit 102 in the same cycle that the IN toggles into the TX circuit 100, which is one cycle earlier than is seen conventionally. In other words, rather than waiting for a global timing signal that is sent to all receiver circuits, the structures disclosed herein use the replica RX circuit 106 to generate an output signal DL4_RX that causes the output latch DFFN_OUT to output the data signal before any such global timing signal would be received. Further, waiting to output the data signal until a global timing signal is received requires that the data signal be output in the next clock cycle; however, because the output latch DFFN_OUT signal occurs before any such global timing signal would be received, the output latch DFFN_OUT outputs the data signal OUT in the same clock cycle that the data signal IN was received by the input latch DFFN_IN. Therefore, the transmission system disclosed herein saves power on precharge, and allows the data signal to be output in the same clock cycle that the input data is received.

If a 0 is being transmitted during the transmission phase, TXin is high and TN2 remains off (non-conductive). This causes bus line 110 to maintain the relatively higher precharge voltage, and thus dissipates no power. Additionally, DL will remain unchanged as set by the precharge operation. The DL value is again captured by DL4_RX.

FIG. 2 is a signal timing diagram illustrating the relative timing of various signals shown in FIG. 1. More specifically, as shown in FIG. 2, the RESETB signal is a delayed version of the global clock signal CLK. After the RESETB signal goes high, the data input signal IN is received, and the eventual rising of the INp signal output from the input buffer DFFN_IN can be seen in FIG. 2.

As shown in FIG. 2, the brief rise of TX_IN occurs because the normally high output of logic control NAND3_IN briefly goes low only when both RESETB and DLBUF_TX are in a high state. More specifically, Figured 2 illustrates that the overlap of high state signals INp and DLBUF_TX is much smaller than a clock cycle (25% of a CLK, 10% of a CLK, 5% of a CLK) which requires that the pull-down transistor TN2 will only reduce the voltage (TX_OUT, RX_INT) on the bus line 110 very slightly, requiring very little voltage (SN, DL) to precharge the bus line 110 in the next cycle.

Additionally, the last few waveforms in FIG. 2 illustrate that DL4_RX signal causes the output latch DFFN_OUT to output data OUT, not in the next clock cycle, but in the current clock cycle (where rising edges of the global clock signal CLK define a clock cycle). More specifically, the waveforms in FIG. 2 show that the data output signal OUT goes high within the same clock cycle that the data input signal IN was high. Therefore, the DL4_RX signal allows the output latch DFFN_OUT to output the data OUT before the global timing signal RESETB would conventionally cause the output latch to output the data signal (which would conventionally occur in the next global clock cycle). This allows the devices herein to output data faster for the same period clock cycle.

Figure 3A:
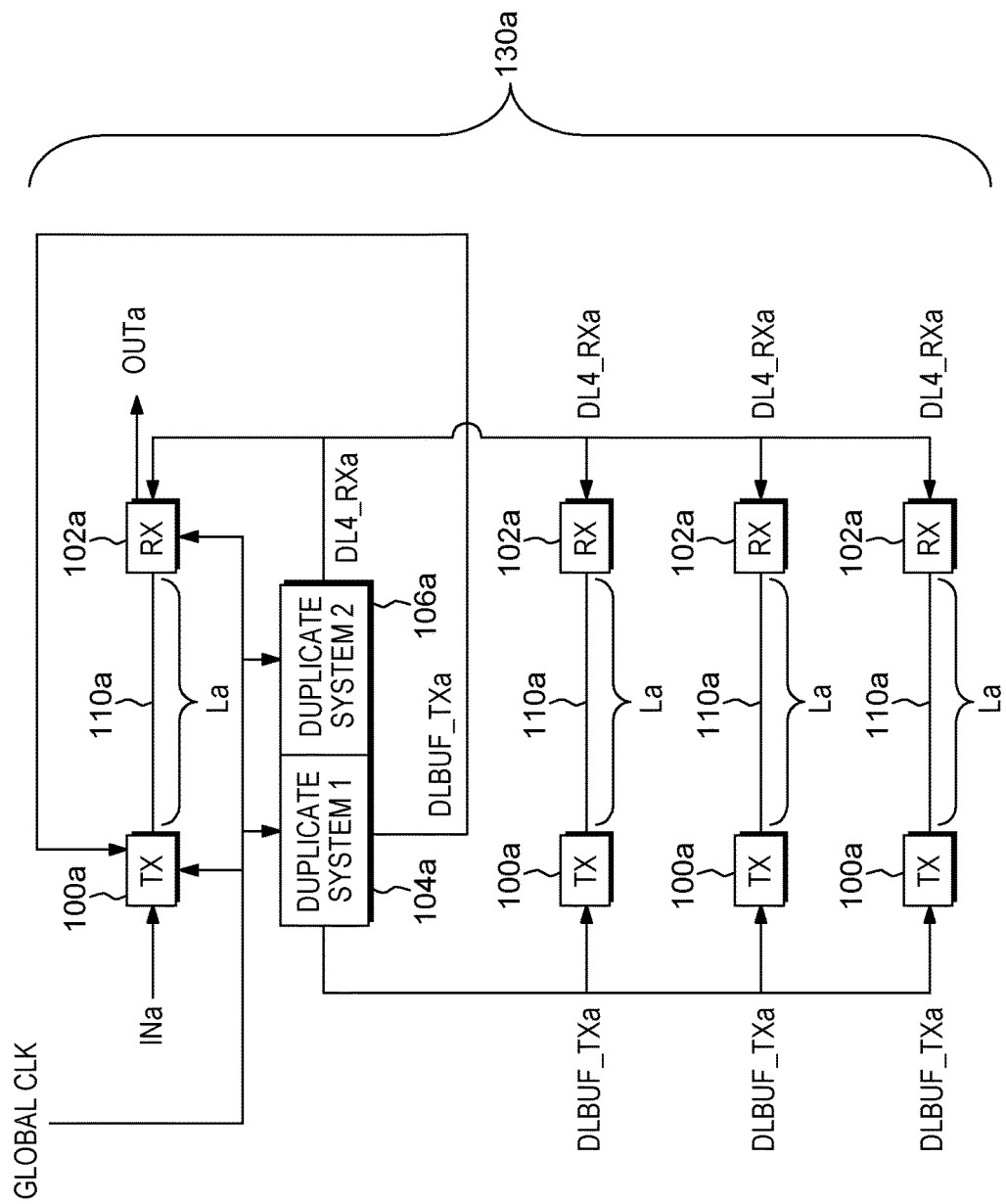
FIG. 3A-3C are schematic diagrams illustrating transmission systems herein.
Figure 3B:
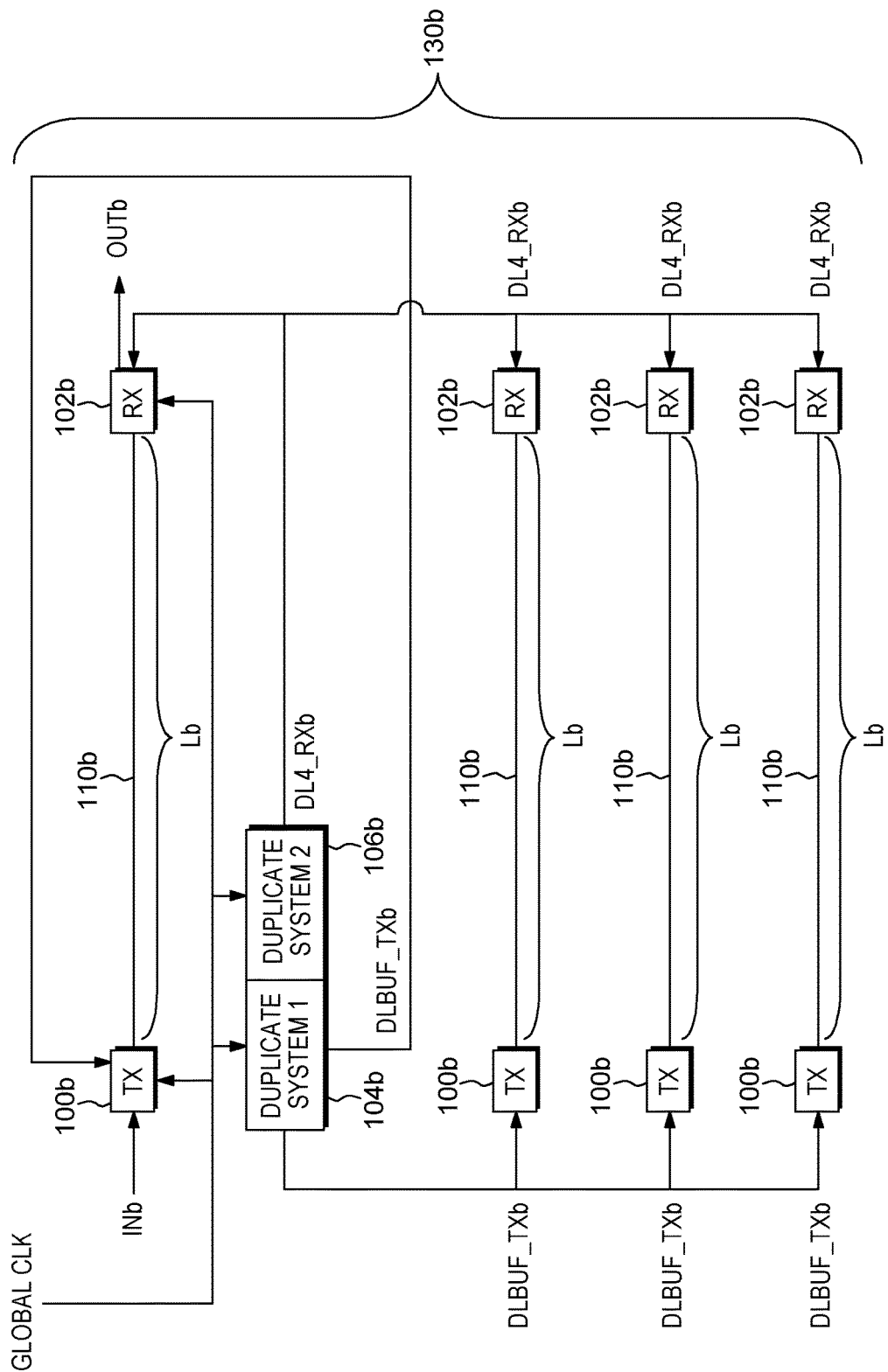
Figure 3C:
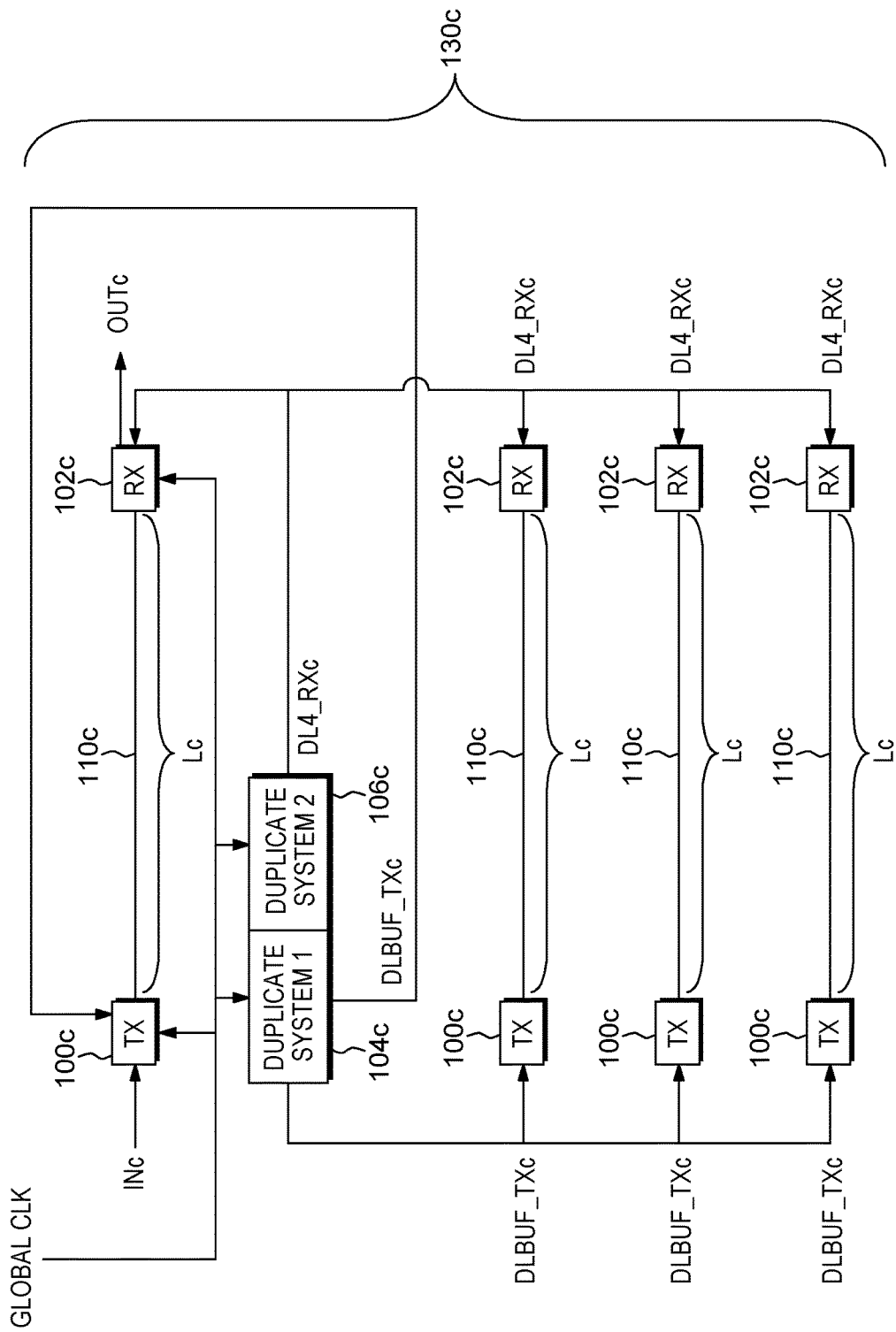

FIGS. 3A-3C illustrate multiple ones of such transmission systems 130*a*, 130*b*, 130*c* connected to the same global clock signal (Global CLK), receiving different input data signals INa, INb, INc, and outputting different output data signals OUTa, OUTb, OUTc. Specifically, FIGS. 3A-3C show the elements of such transmission systems 130*a*, 130*b*, 130*c*, which includes: corresponding transmitter circuits 100*a*, 100*b*, 100*c*; corresponding transmission lines 110*a*, 110*b*, 110*c*; corresponding receiver circuits 102*a*, 102*b*, 102*c*; corresponding duplicate transmission systems 1, 104*a*, 104*b*, 104*c* (which are identified in FIG. 1 as the replica transmission system 104); and corresponding duplicate transmission systems 2, 106*a*, 106*b*, 106*c* (which are identified in FIG. 1 as the replica receiver block 106).

Note that FIGS. 3A-3C illustrate that each duplicate transmission system 1 (104*a*, 104*b*, 104*c*) outputs a corresponding transmission timing control signal DLBUF_TX to a corresponding group of transmitter circuits (100*a*, 100*b*, 100*c*) to save precharge power; and that each duplicate transmission system 2 (106*a*, 106*b*, 106*c*) outputs a corresponding output timing control signal DL4_RX to a corresponding receiver circuit (102*a*, 102*b*, 102*c*) to output the data signal more quickly.

As shown in FIGS. 3A-3C, all the transmission systems 130*a*, 130*b*, 130*c* receive the same global clock signal; however, the transmission lines (110*a*, 110*b*, 110*c*) in each different transmission system have different lengths. Specifically, transmission system 130*a* has a transmission line 110*a* with length La; transmission system 130*b* has a transmission line 110*b* with length Lb, which is longer than La; and transmission system 130*c* has a transmission line 110*c* with length Lc that is longer than La, but shorter than Lb.

Because of the different lengths of the transmission lines 110*a*, 110*b*, 110*c*, each of the duplicate transmission systems 104*a*, 104*b*, 104*c*, 106*a*, 106*b*, 106*c* includes a reference bus (112, 114 in FIG. 1) that matches the length of the transmission line 110*a*, 110*b*, 110*c* of the given transmission system 130*a*, 130*b*, 130*c*. Therefore, duplicate transmission systems 1 and 2 (104*a*, 106*a*) have shorter reference buses (112, 114) relative to duplicate transmission systems 1 and 2 (104*b*, 106*b*); and similarly, duplicate transmission systems 1 and 2 (104*c*, 106*c*) have shorter reference buses (112, 114) relative to duplicate transmission systems 1 and 2 (104*b*, 106*b*).

Such different length reference buses 112, 114 change the timing of when duplicate transmission systems 1 and 2 output the DLBUF_TX and DL4_RX signals to the transmitter circuits 100*a*, 100*b*, 100*c* and the receiver circuits 102*a*, 102*b*, 102*c*, thereby customizing the precharge timing and output signal timing for each different length (La, Lb, Lc) transmission lines 110*a*, 110*b*, 110*c*, in each different transmission system 130*a*, 130*b*, 130*c*.

Therefore, as shown in FIG. 3A, a single duplicate transmission system 1, 104a outputs DLBUF_TXa to all transmitter circuits 100a that are connected to transmission lines 110a that have length La. In this way, a single duplicate transmission system 1, 104a can supply DLBUR_TXa to many transmitter circuits 100a. Similarly, the single duplicate transmission system 2, 106a outputs DL4_RXa to all receiver circuits 102a that are connected to transmission lines 110a that have length La; and, in this way, the single duplicate transmission system 2, 106a can similarly supply DL4_RXa to many transmitter circuits 100a.

FIG. 3B similarly shows that the single duplicate transmission system 1, 104b outputs DLBUF_TXb to all transmitter circuits 100b that are connected to transmission lines 110b that have length Lb, and the single duplicate transmission system 2, 106b outputs DLBUF_TXb to all receiver circuits 102b that are connected to transmission lines 110b that have length Lb. In the same way, FIG. 3C shows that the single duplicate transmission system 1, 104c outputs DLBUF_TXc to all transmitter circuits 100c that are connected to transmission lines 110c that have length Lc, and the single duplicate transmission system 2, 106c outputs DLBUF_TXc to all receiver circuits 102c that are connected to transmission lines 110c that have length Lc.

Figure 4:
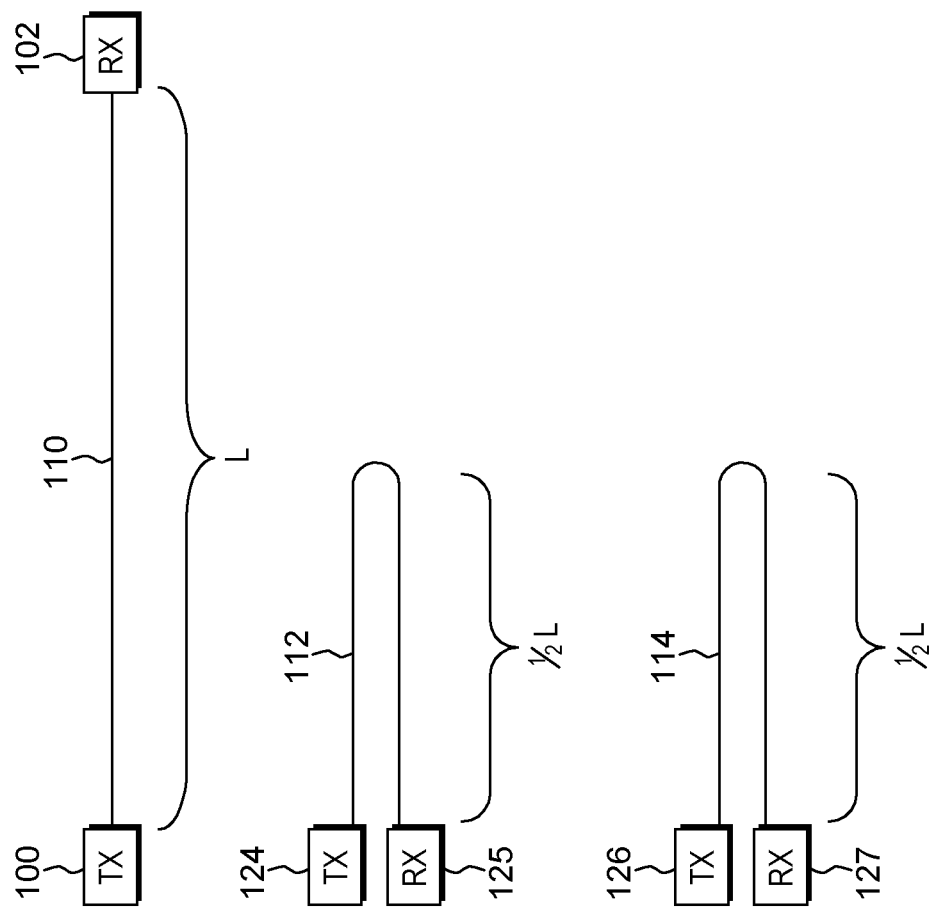
FIG. 4 is a schematic diagram illustrating transmission lines herein.

FIG. 4 shows that while the transmission line 110 (between TX 100 and RX 102 in FIG. 1) and the reference bus lines 112 and 114 (in replica TX circuit 104 and replica RX circuit 106 in FIG. 1) have the same length L, they do not need to occupy the same amount of real estate on the chip. Specifically, because reference bus lines 112 and 114 do not transmit data, and do not actually need to connect to distant receivers, the replica transmitter circuits 124, 126 can be positioned closer to the replica receiver circuits 125, 127. This allows the reference bus lines 112 and 114 to avoid running in a single direction (e.g., potentially returning to approximate the same starting position) to actually consume much less chip real estate. In the example shown in FIG. 4, the reference bus lines 112 and 114 take up one-half of the chip real estate of the same length transmission line 110 by running one-half of the length L and returning over one-half the length L.

Therefore, as shown above, devices disclosed herein include (among other components) a primary transmission system (100-110-102), and first and second duplicate (dummy or non-transmitting) transmission systems 104, 106, that are used only to produce transmission line-specific precharge and output timing signals for the primary transmission system (100-110-102). The primary transmission system (100-110-102) includes (among other components) a primary transmitter circuit 100 receiving a data signal IN, a primary transmission line 110 connected to the primary transmitter circuit 100, and a primary receiver circuit 102 connected to the primary transmission line. The primary transmission system (100-110-102), the first duplicate transmission system 104, and the second duplicate transmission system 106 are all started using the same global clock signal CLK that is used to produce the delayed global clock signal RESETB.

The primary transmitter circuit 100 includes a pull-down transistor TN2 controlling voltage pull-down of the primary transmission line 110 when transmitting the input data IN. The first duplicate transmission system 104 is connected to the primary transmitter circuit 100, and supplies a transmission timing control signal DLBUF_TX to the pull-down transistor TN2. The pull-down transistor TN2 stops reducing the voltage of the primary transmission line 110 when the transmission timing control signal DLBUF_TX is received to decrease the amount of voltage used by the precharging circuit TP1, TP2, TN1 when precharging the primary transmission line 110 (in subsequent data transmissions). The transmission timing control signal DLBUF_TX is specific to the length of the primary transmission line 110 to which the primary transmitter circuit 100 is connected, and is output independently of all other global timing signals (e.g., CLK, RESETB, etc.). Additionally, the first duplicate transmission system 104 has a feedback loop that provides the transmission timing control signal DLBUF_TX as a second timing control input to the first duplicate transmission system 104.

The primary receiver circuit 102 includes a precharging circuit TP1, TP2, TN1 that precharges the primary transmission line 110 before each data transmission, a sense latch 120 that outputs a sense output signal DL, and an output latch DFFN_OUT. The precharging circuit TP1, TP2, TN1 performs a precharge operation to charge the primary transmission line 110 to a relatively higher voltage state, and the precharge operation is based on the primary transmission line 110 and the sense output signal DL being at a relatively lower voltage state (e.g., that is lower than a relatively higher voltage state), and otherwise the line is already at a relatively higher voltage state and does not need to be precharged.

The second duplicate transmission system 106 is connected to the primary receiver circuit 102, and supplies an output timing control signal DL4_RX to the output latch DFFN_OUT to control the timing of the output latch DFFN_OUT outputting the data signal OUT. The primary receiver circuit 102 outputs the data signal when the output timing control signal DL4_RX is received by the output latch DFFN_OUT, and the output timing control signal DL4_RX is specific to the primary transmission line 110 to which the primary receiver circuit 102 is connected, and is output independently of all other global timing signals (e.g., CLK, RESETB, etc.). The second duplicate transmission system 106 provides the output timing control signal DL4_RX to the primary receiver circuit 102 for transmitted data in the same clock cycle that the transmitted data IN was received by the primary transmitter circuit 100.

The first duplicate transmission system 104 has a first delay chain DELAY-CHAIN_TX not included in the primary transmission system (100-110-102) that produces the transmission timing control signal DLBUF_TX. Also, the second duplicate transmission system 106 has a second delay chain DELAY-CHAIN_RX not included in the primary transmission system (100-110-102) that produces the transmission timing control signal DLBUF_TX. The first duplicate transmission system 104 and the second duplicate transmission each include a duplicate transmission line 112, 114 that has the same length as the primary transmission line 110.

The structure as described above is used in integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

Within a transistor, the semiconductor (or channel region) is positioned between a conductive "source" region and a similarly conductive "drain" region and when the semiconductor is in a conductive state, the semiconductor allows electrical current to flow between the source and drain. A "gate" is a conductive element that is electrically separated from the semiconductor by a "gate oxide" (which is an insulator) and current/voltage within the gate changes the conductivity of the channel region of the transistor.

A positive-type transistor "P-type transistor" uses impurities such as boron, aluminum or gallium, etc., within an intrinsic semiconductor substrate (to create deficiencies of valence electrons) as a semiconductor region. Similarly, an "N-type transistor" is a negative-type transistor that uses impurities such as antimony, arsenic or phosphorous, etc., within an intrinsic semiconductor substrate (to create excessive valence electrons) as a semiconductor region.

While only one or a limited number of transistors are illustrated in the drawings, those ordinarily skilled in the art would understand that many different types transistor could be simultaneously formed with the embodiment herein and the drawings are intended to show simultaneous formation of multiple different types of transistors; however, the drawings have been simplified to only show a limited number of transistors for clarity and to allow the reader to more easily recognize the different features illustrated. This is not intended to limit this disclosure because, as would be understood by those ordinarily skilled in the art, this disclosure is applicable to structures that include many of each type of transistor shown in the drawings.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements).

The terminology used herein is for the purpose of describing particular embodiments only and is not intended to be limiting of this disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In the drawings herein, the same identification numeral identifies the same or similar item. The descriptions of the various embodiments herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A device comprising:
    a primary transmission system comprising:
        a primary transmitter circuit receiving a data signal;
        a primary transmission line connected to the primary transmitter circuit; and
        a primary receiver circuit connected to the primary transmission line;
    a first duplicate transmission system connected to the primary transmitter circuit, the first duplicate transmission system supplies a transmission timing control signal to the primary transmitter circuit, and the primary transmitter circuit stops reducing the voltage of the primary transmission line when the transmission timing control signal is received; and
    a second duplicate transmission system connected to the primary receiver circuit, the second duplicate transmission system supplies an output timing control signal to the primary receiver circuit, and the primary receiver circuit outputs the data signal when the output timing control signal is received.

2. The device according to claim 1, the first duplicate transmission system has a first delay chain not included in the primary transmission system that produces the transmission timing control signal, and the second duplicate transmission system has a second delay chain not included in the primary transmission system that produces the output timing control signal.

3. The device according to claim 1, the first duplicate transmission system and the second duplicate transmission system each include a duplicate transmission line that has the same length as the primary transmission line.

4. The device according to claim 1, the first duplicate transmission system provides a feedback loop that provides the transmission timing control signal as an input to the first duplicate transmission system.

5. The device according to claim 1, the primary receiver circuit includes a latch outputting a sense output signal,
    the primary receiver circuit performs a precharge operation to charge the primary transmission line to a relatively higher voltage state, and
    the precharge operation is based on the primary transmission line and the sense output signal being at a relatively lower voltage state that is lower than the relatively higher voltage state.

6. The device according to claim 1, the second duplicate transmission system provides the output timing control signal to the primary receiver circuit for transmitted data in the same clock cycle that the transmitted data was received by the primary transmitter circuit.

7. The device according to claim 1, the primary receiver circuit includes an output latch, and the second duplicate transmission system provides the output timing control signal to the output latch to control the timing of the output latch outputting the data signal.

8. A transmission circuit comprising:
    a primary transmission system comprising:
        a primary transmitter circuit receiving a data signal;
        a primary transmission line connected to the primary transmitter circuit, the primary transmitter circuit includes a pull-down transistor controlling voltage pull-down of the primary transmission line; and
        a primary receiver circuit connected to the primary transmission line, the primary receiver circuit includes an output latch;
    a first duplicate transmission system connected to the primary transmitter circuit, the first duplicate transmission system supplies a transmission timing control signal to the pull-down transistor, and the pull-down transistor stops reducing the voltage of the primary transmission line when the transmission timing control signal is received; and a second duplicate transmission system connected to the primary receiver circuit, the second duplicate transmission system supplies an output timing control signal to the output latch, and the primary receiver circuit outputs the data signal when the output timing control signal is received by the output latch.

9. The transmission circuit according to claim 8, the first duplicate transmission system has a first delay chain not included in the primary transmission system that produces the transmission timing control signal, and the second duplicate transmission system has a second delay chain not included in the primary transmission system that produces the output timing control signal.

10. The transmission circuit according to claim 8, the first duplicate transmission system and the second duplicate transmission system each include a duplicate transmission line that has the same length as the primary transmission line.

11. The transmission circuit according to claim 8, the first duplicate transmission system provides a feedback loop that provides the transmission timing control signal as an input to the first duplicate transmission system.

12. The transmission circuit according to claim 8, the primary receiver circuit includes a latch outputting a sense output signal, the primary receiver circuit performs a precharge operation to charge the primary transmission line to a relatively higher voltage state, and the precharge operation is based on the primary transmission line and the sense output signal being at a relatively lower voltage state that is lower than the relatively higher voltage state.

13. The transmission circuit according to claim 8, the second duplicate transmission system provides the output timing control signal to the primary receiver circuit for transmitted data in the same clock cycle that the transmitted data was received by the primary transmitter circuit.

14. The transmission circuit according to claim 8, the primary receiver circuit includes an output latch, and the second duplicate transmission system provides the output timing control signal to the output latch to control the timing of the output latch outputting the data signal.

15. A transmission circuit comprising:
a primary transmission system comprising:
   a primary transmitter circuit receiving a data signal;
   a primary transmission line connected to the primary transmitter circuit, the primary transmitter circuit includes a pull-down transistor controlling voltage pull-down of the primary transmission line; and
   a primary receiver circuit connected to the primary transmission line, the primary receiver circuit includes an output latch and a precharging circuit that precharges the primary transmission line before each data transmission;

a first duplicate transmission system connected to the primary transmitter circuit, the first duplicate transmission system supplies a transmission timing control signal to the pull-down transistor, the pull-down transistor stops reducing the voltage of the primary transmission line when the transmission timing control signal is received to decrease the amount of voltage used by the precharging circuit to precharge the primary transmission line in subsequent data transmissions, the transmission timing control signal is specific to the primary transmission line to which the primary transmitter circuit is connected, and is output independently of all other global timing signals; and a second duplicate transmission system connected to the primary receiver circuit, the second duplicate transmission system supplies an output timing control signal to the output latch, the primary receiver circuit outputs the data signal when the output timing control signal is received by the output latch, and the output timing control signal is specific to the primary transmission line to which the primary receiver circuit is connected, and is output independently of all other global timing signals.

16. The transmission circuit according to claim 15, the first duplicate transmission system has a first delay chain not included in the primary transmission system that produces the transmission timing control signal, and the second duplicate transmission system has a second delay chain not included in the primary transmission system that produces the output timing control signal.

17. The transmission circuit according to claim 15, the first duplicate transmission system and the second duplicate transmission system each include a duplicate transmission line that has the same length as the primary transmission line.

18. The transmission circuit according to claim 15, the first duplicate transmission system provides a feedback loop that provides the transmission timing control signal as an input to the first duplicate transmission system.

19. The transmission circuit according to claim 15, the primary receiver circuit includes a latch outputting a sense output signal, the primary receiver circuit performs a precharge operation to charge the primary transmission line to a relatively higher voltage state, and the precharge operation is based on the primary transmission line and the sense output signal being at a relatively lower voltage state that is lower than the relatively higher voltage state.

20. The transmission circuit according to claim 15, the second duplicate transmission system provides the output timing control signal to the primary receiver circuit for transmitted data in the same clock cycle that the transmitted data was received by the primary transmitter circuit.

\* \* \* \* \*